United States Patent [19]

Meller et al.

[11] 4,408,773

[45] Oct. 11, 1983

[54] SELF PUMPING, LEVEL REGULATING APPARATUS FOR VEHICLES, ESPECIALLY AUTOMOBILES

[75] Inventors: Theo Meller; Heinz Knecht, both of Eitorf, Fed. Rep. of Germany

[73] Assignee: BOGE GmbH, Eitorf, Fed. Rep. of Germany

[21] Appl. No.: 258,998

[22] Filed: Apr. 30, 1981

[30] Foreign Application Priority Data

May 24, 1980 [DE] Fed. Rep. of Germany ....... 3020050

[51] Int. Cl.³ .............................................. B60G 17/00
[52] U.S. Cl. .................................... 280/611; 280/708; 267/64.17
[58] Field of Search .............. 280/6 R, 6.1, 6 H, 6.11, 280/702, 704, 708, 709, 710, 714; 180/41, 165; 267/DIG. 2, DIG. 3, 64.16, 64.17

[56] References Cited

U.S. PATENT DOCUMENTS

| | | | |
|---|---|---|---|
| 3,083,026 | 3/1963 | Broadwell | 280/6 H |
| 3,353,816 | 11/1967 | Axthammer | 267/64.16 |
| 3,380,247 | 4/1968 | Colmerauer | 280/6 |
| 3,527,467 | 9/1970 | Scott et al. | 280/710 |
| 3,542,387 | 11/1970 | Schmid | 280/6 R |
| 3,610,656 | 10/1971 | Klees | 280/709 |
| 3,623,746 | 11/1971 | Zielinski | 280/710 |
| 3,904,183 | 9/1975 | Allinquant et al. | 267/64.17 |
| 4,345,773 | 8/1982 | Brown | 280/6 R |

FOREIGN PATENT DOCUMENTS 1135779 8/1962 Fed. Rep. of Germany ... 267/64.17

*Primary Examiner*—Robert R. Song
*Assistant Examiner*—Dennis Pedder

[57] ABSTRACT

A self pumping, level regulating apparatus for vehicles comprises at least one hydropneumatic, telescoping spring element, and a pumping and regulating element for pumping oil into the work chamber of the spring element as a function of the motion of an axle of the vehicle, to raise the level of oil in the work chamber, and hence the level of the vehicle and for moving oil out of the work chamber when a predetermined level is exceeded. In contrast to an arrangement where the telescoping spring element and the pumping and regulating element are integrated and disposed between relatively movable members, such as levers fixed to two associated swinging axle halves, only the pumping and regulating element is so disposed, and the telescoping spring element is separately disposed between the vehicle body and the wheel axle. A better distribution of force is thus achieved. Moreover, a single pumping and regulating element can serve a number of hydropneumatic spring elements. An advantageous form of pumping and regulating element includes a pumping chamber with a pump rod, with passages controlled by the pump rod so as to automatically return oil from the work chamber of the spring element to the oil reservoir when a predetermined oil or vehicle level is exceeded.

8 Claims, 3 Drawing Figures

SELF PUMPING, LEVEL REGULATING APPARATUS FOR VEHICLES, ESPECIALLY AUTOMOBILES

FIELD OF THE INVENTION

This invention relates to a self pumping, level regulating device or apparatus for vehicles, particularly automobiles, the apparatus having at least one hydropneumatic, telescoping spring element (preferably of the damping type) with a gas spring chamber, and a pumping and regulating element that pumps oil into the work chamber of the telescoping spring element as a function of the spring motions of at least one wheel axle of the vehicle, to raise the oil level and hence the vehicle level, and for moving oil out of the work chamber of the telescoping spring element when a predetermined or ideal level is exceeded.

BACKGROUND AND SUMMARY

It is known that a self pumping, level regulating device generally of the above described type, as disclosed in principle in, for example, German Patent 11 35 779, especially FIG. 2, can be disposed between two upwardly directed levers that are fixed rigidly on two associated swinging axle halves of a vehicle, in the region of their articulations to the vehicle body. Such a level regulating device functions economically and is quite compact. However, because of the substantial forces involved, and hence the substantial bracing or reinforcing required to accommodate these concentrated forces, the generated effect is such that the vehicle axles have to be of correspondingly large dimensions and strength. Accordingly, with a given material, there not only are correspondingly higher material and processing costs, but also there is a correspondingly increased weight of the axles. This is contrary to the desired energy saving technique of keeping the weight of the vehicle and its individual parts as low as possible. Therefore, while these known devices, typically being integrated as single device, are indeed workable and have their advantages, they at the same time are disadvantageous because of the increased structural strength and weight required of the vehicle parts to which they are connected in order to accommodate the substantial concentrated forces involved.

The present invention is directed to the problem of producing a simple and efficient self pumping, level regulating apparatus or device of the general type previously mentioned, but which is an improvement over known level regulating devices, with retention as much as possible of the advantages of the known devices, especially so that the forces acting on the vehicle axles and other parts will be reduced, so that the axle and such other parts may be kept smaller and lighter.

This problem is solved generally according to the invention in that at least one telescoping spring element is disposed in the region of the vehicle wheels between the vehicle body and the wheel axle, and the pumping and regulating element is disposed separately, advantageously in the mid-zone of the vehicle axle, so as to be acted upon by its spring movement. Because of the improved distribution of forces acting on the axle or other bracing parts in apparatus according to the invention, the forces being distributed over the parts rather than being concentrated, the bracing parts such as wheel axles or the like can be made smaller and lighter. This is practically achieved according to the invention in that instead of a level regulating device of the type used heretofore with integrated telescoping spring element, there is now disposed only the pumping and regulating element, in which the forces that have to be accommodated or braced are relatively minor. The telescoping spring element is separately disposed in the region of the individual wheels, where they evoke significantly less bracing force requirements. Moreover, there is the advantage that a single pumping and regulating element can serve for pressure supply and regulation of a number of hydropneumatic spring elements. Between the individual telescoping spring elements that are acted on by the central pumping and regulating element, there is the possibility of balancing in a known manner by connection of these elements with each other, and by the choke effect thereby occurring in the connecting lines.

The level regulating device or element in accordance with the invention has the further advantage of great economy with retention of the self pumping function, in that the self pumping and the regulation are effected in one and the same element, namely, the pumping and regulating element. Use of level regulating devices that consume supplementary external energy, such as remote-supplied level regulators, is not necessary. All elements of the level regulating device according to the invention can be standardized.

It is known in the art to dispose a telescoping spring element in the region of the vehicle wheels between the vehicle body and the wheel axle in the case of remote-supplied hydropneumatic level regulating devices. In these known level regulating devices, however, there is an extra outlay, because it is necessary to supply supplementary external energy, and to provide a remote feed device and reservoir separate from the regulating element and also extra tubing or piping is required. Furthermore, the regulator must have an adjusting arrangement.

According to an especially preferred form of embodiment of the invention, the pumping and regulating element is actuatably disposed between two upwardly directed levers that are rigidly fixed to two associated swinging axle halves, in the region of the axles' articulation to the vehicle body. In another exemplary embodiment that is also advantageous, the pumping and regulating element is actuatably disposed between the vehicle body and a deflector part that is located on the stabilizer fixed to the vehicle axle, in the middle. The deflector part can be, for example, a bend of the stabilizer, a lever, or the like.

Advantageously, it is also possible to dispose the pumping and regulating element in the middle of a rigid axle, between it and the vehicle body, in an actuatable manner.

According to an especially preferred form of embodiment of the invention, the pumping and regulating element is formed by a cylinder with two end faces, presenting a central pumping chamber with a pump rod therein that issues reciprocably to the outside, and an oil reservoir chamber surrounding the pump chamber. The pumping chamber is connected via an intake conduit and intake valve with the oil reservoir, and is connected with the telescoping spring element via a discharge conduit and discharge valve. The discharge conduit is in open communication with a return conduit running in the partition between the pumping chamber and the oil reservoir, the return conduit being connected to the pumping chamber via first discharge bores disposed advantageously in the mid-zone of the pumping chamber, with which bores there are associated second discharge bores disposed in the partition and connecting the pumping chamber with the oil reservoir, such that the return conduit can be connected with the oil reservoir via the first discharge bores, the pumping chamber, and the second discharge bores. Such a pumping and regulating element is quite simple in construction and function, and is highly reliable. so long as the discharge bores constituting the regulation bores are covered by the pump rod, oil will be drawn from the oil reservoir into the pumping chamber and forced into the hydropneumatic spring element in response to actuation of the pump rod and the cylinder by the spring motions of the axles. When a given oil level or vehicle level is attained, oil will be returned through the discharge bores from the working chamber of the spring element into the oil reservoir of the pumping and regulating element. Thus, there is simple level regulation of the vehicle body.

Advantageously the pump rod is slightly tapered at its free end that is disposed in the pumping chamber, such that the length of the conical end section corresponds substantially to the distance over which the outermost discharge bores are distributed, that is, the distance between the outermost discharge bores. In this manner, there is achieved in a simple way a reduction of the pump output at about the ideal level, and hence a stable regulation.

Preferably there is a gas cushion in the oil reservoir that is under a predetermined base pressure. Thereby provision of a supplementary valve to hold minimal pressure is not necessary.

Preferably the pump and regulating element presents at the outer pump rod end and at the opposite face of the cylinder, elastic bearings for fastening to the adjacent parts of the vehicle. In view of the relatively small external dimensions of the pumping and regulating element, relatively large elastic bearings can be utilized, with their favorable effect on impact.

Other and further advantages and features of the invention will be apparent from the ensuing description of preferred exemplary embodiments that are schematically shown in the appended drawings.

DESCRIPTION OF PREFERRED EMBODIMENTS

Figure 1:
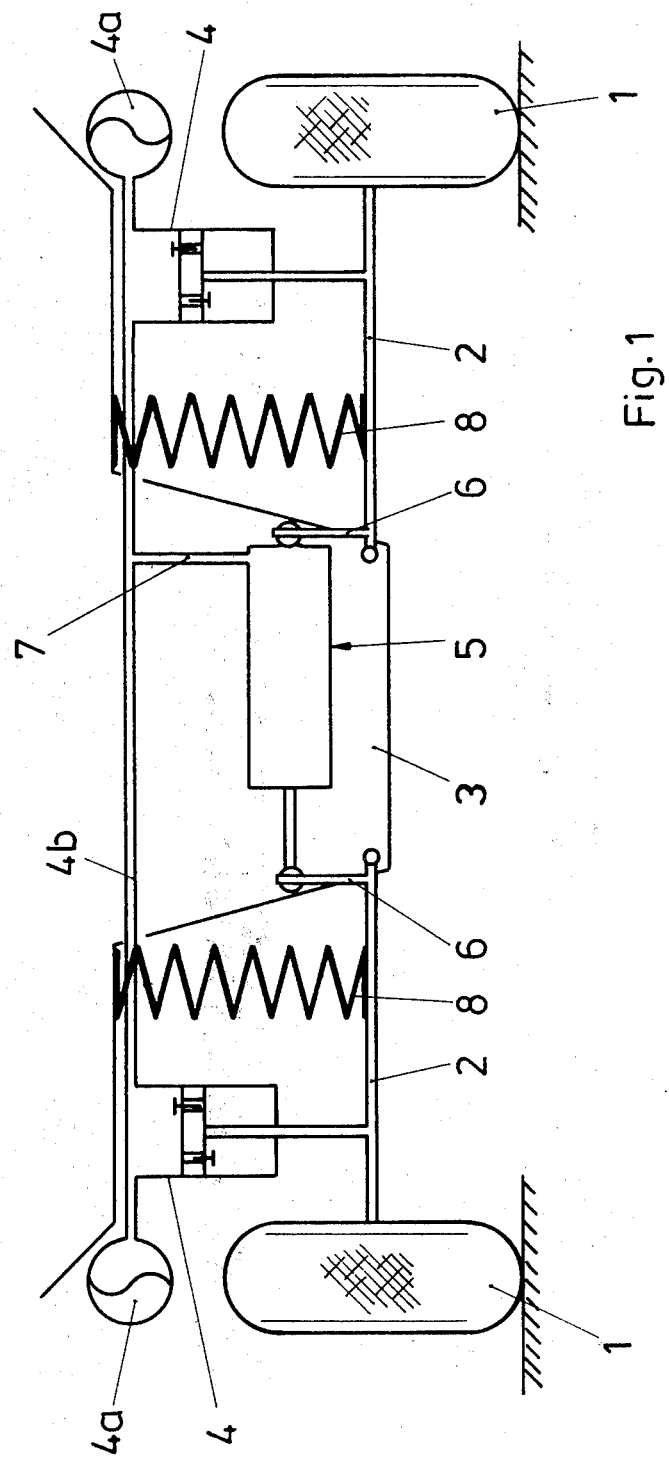
FIG. 1 schematically illustrates a vehicle frame provided with a self pumping, level regulating device in accordance with the invention.

FIG. 1 shows in highly schematic form a first embodiment of a self pumping, level regulating device or apparatus for automobiles in accordance with the invention. Vehicle wheels 1 are swingably articulated by means of swinging axle halves 2 on vehicle body 3. In the region of each vehicle wheel 1, there is a damping, hydropneumatic, telescoping spring element 4 with gas spring chamber 4a of a known construction, disposed between vehicle body 3 and axle 2. The two telescoping spring elements are interconnected by a connecting line 4b.

The self pumping, level regulating apparatus according to the invention further includes a pumping and regulating element 5 which is disposed separately in the mid-zone of the axle 2, and is actuated by the swing motions of the axle halves. In particular, pumping and regulating element 5 is disposed actuatably between two levers 6 that are respectively fixed rigidly to the two swinging axle halves in their regions of articulation to vehicle body 3.

Pumping and regulating element 5 pumps as a function of the spring motions of axles 2, through a high pressure line 7, to raise the level of oil in the working chambers of telescoping spring elements 4, while upon exceeding of the ideal level, the pumping and regulating element 5 delivers oil from the working chamber of telescoping spring elements 4 back through high pressure line 7.

The described and illustrated construction and arrangement of the self pumping, hydropneumatic, level regulating device according to the invention has, above all, the advantage that the forces occurring on axles 2 in the region of the articulation points are kept particularly low. For example, the pumping forces alone that occur in the pumping and regulating element 5 according to a typical example are 60 to 70 kp. These forces are practically negligible as compared to the forces of 7000 kp that occur there in known self pumping, hydropneumatic, level regulating devices with integrated telescoping spring elements.

For the sake of completeness, it should be noted that in the illustrated embodiment, there are mechanical supporting spring 8 disposed between the vehicle axles 2 and vehicle body 3. The hydropneumatic spring elements 4, 4a are thus advantageously partly bearing or supporting.

Figure 2:
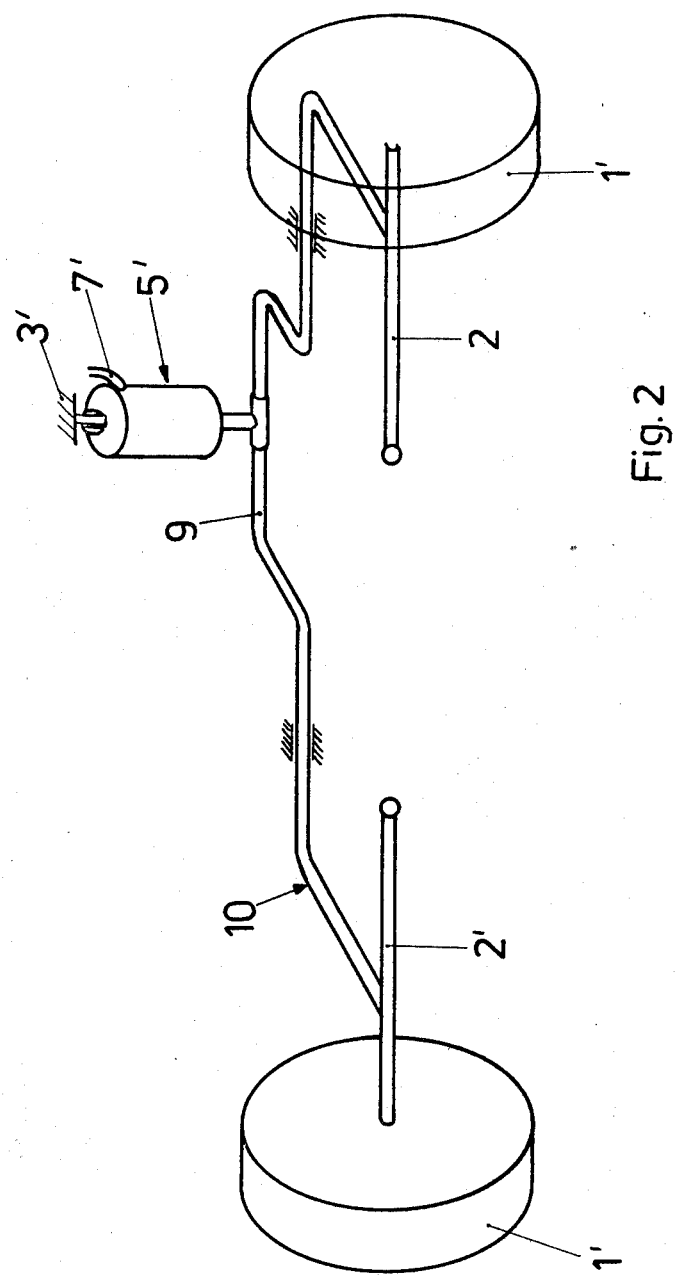
FIG. 2 shows in schematic perspective a partial representation of another embodiment of the invention, for use in a vehicle frame with a stabilizer.

FIG. 2 shows another exemplary embodiment of the invention. For the sake of visual clarity, the telescoping spring elements 4, 4a that are constructed and disposed as in FIG. 1 have not been shown. In this exemplary embodiment, the arrangement of the pumping and regulating element 5' is different as compared to FIG. 1. In particular, the pumping and regulating element 5' is actuatably disposed between vehicle body 3' and a deflector part 9 that is located on a stabilizer 10 fixed to axle 2', in the middle. Deflector part 9 is constituted by bend in stabilizer 10. Otherwise, the functioning of the embodiment as shown in FIG. 2 is basically that of the embodiment according to FIG. 1.

In still another exemplary embodiment that is not illustrated in the drawings, the pumping and regulating element is actuatably disposed in the middle of a rigid axle between the axle and the vehicle body.

Figure 3:
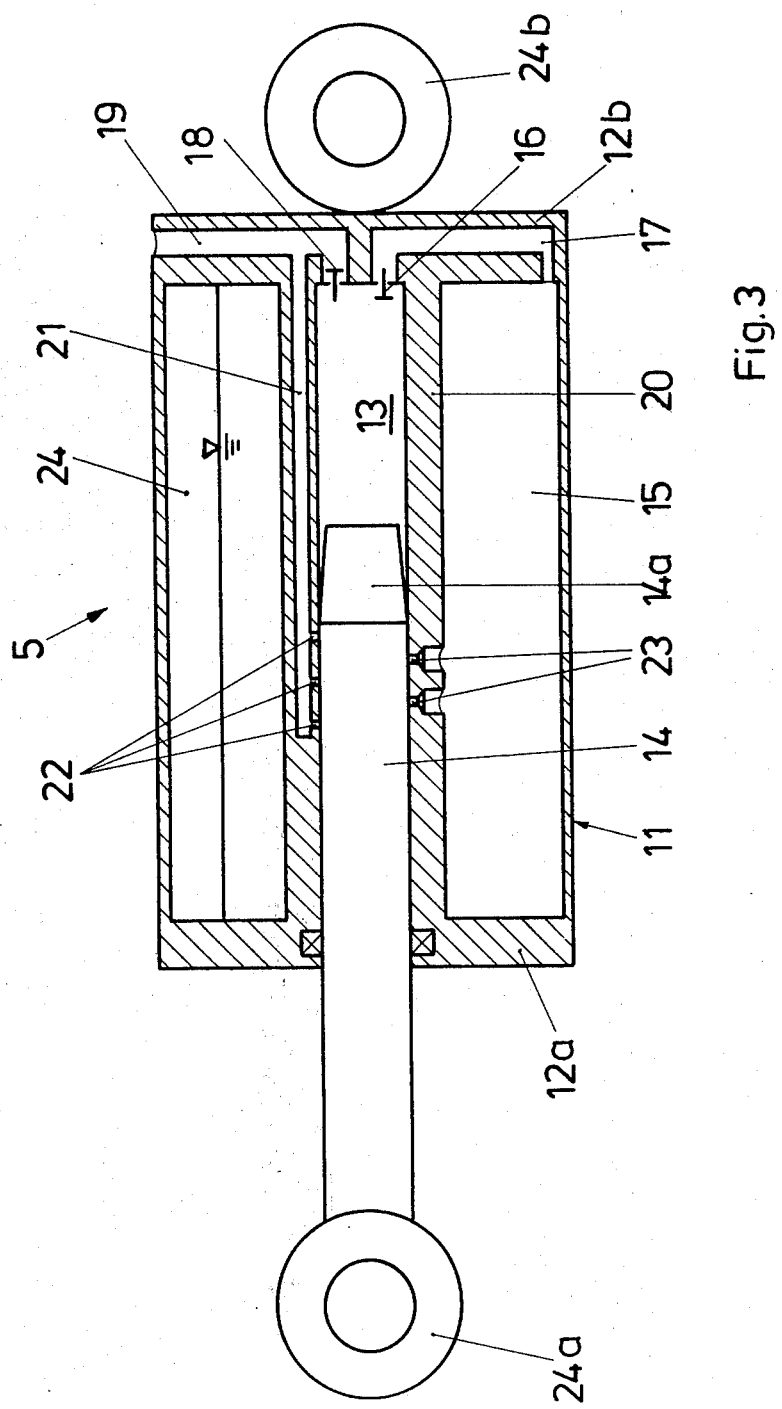
FIG. 3 illustrates in longitudinal section a pumping and regulating element according to the invention.

FIG. 3 shows in some detail the basic structure of a pumping and regulating element 5 according to the invention. It is constituted by a cylinder 11 with two end faces 12a, 12b, and presents a central pumping chamber 13 with a pump rod 14 disposed reciprocably therein and extending to the outside, and an oil reservoir 15 that surrounds the pumping chamber 13. Pumping chamber 13 is connected on the one hand with oil reservoir 15 via an intake 17 that has an intake valve 16, and on the other hand it is connected with the telescoping spring elements 4, 4a via a discharge passage 19 with a discharge valve 18.

Discharge passage 19 is also in open communication with a discharge passage 21 that runs in the partition 20 between pumping chamber 13 and oil reservoir 15, which passage 21 is connected with pumping chamber 13 via first discharge bores 22 disposed in the mid-zone of chamber 13. The second discharge bores 23 located in partition 20 are associated with the first bores 22 and connect pumping chamber 13 with oil reservoir 15.

Pump rod 14 is slightly conical at its free end 14a that is disposed in pumping chamber 13, whereby the length of the conical end section 14a corresponds essentially to the distance between the outermost discharge bores 22.

There is a gas cushion 24 under basic pressure in oil reservoir 15.

The pumping and regulating element has elastic bearings 24a and 24b at the outer pump rod 10 and on the opposite end face 12b of cylinder 11, for fastening to the adjacent vehicle parts.

The operation of the pumping and regulating element 5 is readily understandable by persons skilled in the art on the basis of the foregoing description of its construction. For the sake of completeness, it should be noted that the discharge passage 19 opens into the high pressure line 7 shown in FIG. 1. It is also to be noted that the pumping and regulating element 5' shown in FIG. 2 corresponds basically in structure and operation to the pumping and regulating element 5. In both of these pumping and regulating elements, pump rod 14 constitutes in an economical way both the actuating and the guiding part thereof.

Having thus described and illustrated preferred embodiments of our invention, we claim:

1. In a self pumping, level regulating apparatus in a wheeled vehicle, comprising at least one damping hydropneumatic telescoping spring element with a gas spring chamber, and an automatic pumping and regulating element for pumping oil into the working chamber of the telescoping spring element as a function of the spring motion of at least one wheel axle of the vehicle for increasing the vehicle level, and, upon exceeding of a predetermined level, for delivering oil back from the working chamber of the telescoping spring element, the improvement characterized in that the hydropneumatic telescoping spring element is separate from the pumping and regulating element and is connected in the region of a vehicle wheel between the vehicle body and the wheel axle, and in that the pumping and regulating element comprises a pumping means, level regulating means and an oil storage reservoir in a compact construction and is separately disposed generally in the central area of the vehicle relative to opposed wheels and is connected to be actuated and controlled by the spring motions and relative positions of a generally centrally located part of a wheel axle, and wherein the pumping and regulating element is actuatably disposed between two upwardly directed levers that are rigidly fixed on two associated swinging axle halves in the region of their articulation to the vehicle body.

2. In a self pumping, level regulating apparatus in a wheeled vehicle, comprising at least one damping hydropneumatic telescoping spring element with a gas spring chamber, and an automatic pumping and regulating element for pumping oil into the working chamber of the telescoping spring element as a function of the spring motion of at least one wheel axle of the vehicle for increasing the vehicle level, and, upon exceeding of a predetermined level, for delivering oil back from the working chamber of the telescoping spring element, the improvement characterized in that the hydropneumatic telescoping spring element is separate from the pumping and regulating element and is connected in the region of a vehicle wheel between the vehicle body and the wheel axle, and in that the pumping and regulating element comprises a pumping means, level regulating means and an oil storage reservoir in a compact construction and is separately disposed generally in the central area of the vehicle relative to opposed wheels and is connected to be actuated and controlled by the spring motions and relative positions of a generally centrally located part of a wheel axle, and wherein the pumping and regulating element is actuatably disposed between the vehicle body and a deflector part disposed generally in the central area of the vehicle in the middle of a stabilizer fixed to the vehicle axle.

3. In a self pumping, level regulating apparatus in a wheeled vehicle, comprising at least one damping hydropneumatic telescoping spring element with a gas spring chamber, and an automatic pumping and regulating element for pumping oil into the working chamber of the telescoping spring element as a function of the spring motion of at least one wheel axle to the vehicle for increasing the vehicle level, and, upon exceeding of a predetermined level, for delivering oil back from the working chamber of the telescoping spring element, the improvement characterized in that the hydropneumatic telescoping spring element is separate from the pumping and regulating element and is connected in the region of a vehicle wheel between the vehicle body and the wheel axle, and in that the pumping and regulating element comprises a pumping means, level regulating means and an oil storage reservoir in a compact construction and is separately disposed generally in the central area of the vehicle relative to opposed wheels and is connected to be actuated and controlled by the spring motions and relative positions of a generally centrally located part of a wheel axle, and wherein said pumping and regulating element is constituted by a cylinder with two end faces forming a central pump chamber and an oil reservoir surrounding the pump chamber, a pump rod reciprocably disposed in the pump chamber and extending to the exterior, said pump chamber being connected with the oil reservoir via an intake passage having an intake valve and being connected with said telescoping spring element via a discharge passage having a discharge valve, said discharge passage being in open communication with a discharge conduit located in a partition between said pump chamber and said oil reservoir, said discharge conduit being connected with said pump chamber via first discharge bores located generally in the mid-zone of the pumping chamber, and said pumping chamber being connected with said oil reservoir via second discharge bores located in the partition, said bores being so located as to be controlled by the pump rod depending on its position.

4. Apparatus as claimed in claim 3 wherein said pump rod is slightly conical at its free end disposed in the pump chamber, the length of the conical end section corresponding substantially to the distance between the outermost first discharge bores.

5. Apparatus as claimed in claim 4 wherein there is a pressurized gas cushion in said oil reservoir.

6. Apparatus as claimed in claim 4 wherein said pumping and regulating element has elastic bearings respectively at the outer pump rod end and on the opposite end face of said cylinder for fixation to adjacent vehicle parts.

7. Apparatus as claimed in claim 4 wherein said pump rod is disposed in and mates with the walls of said pump chamber so as to constitute the actuating and guiding part of said pumping and regulating element.

8. In a self pumping, level regulating apparatus in a wheeled vehicle, comprising at least one damping hydropneumatic telescoping spring element with a gas spring chamber, and an automatic pumping and regulating element for pumping oil into the working chamber of the telescoping spring element as a function of the spring motion of at least one wheel axle of the vehicle for increasing the vehicle level, and, upon exceeding of a predetermined level, for delivering oil back from the working chamber of the telescoping spring element, the improvement characterized in that the hydropneumatic telescoping spring element is separate from the pumping and regulating element and is connected in the region of a vehicle wheel between the vehicle body and the wheel axle, and in that the pumping and regulating element comprises a pumping means, level regulating means and an oil storage reservoir in a compact construction and is separately disposed generally in the central area of the vehicle relative to opposed wheels and is connected to be actuated and controlled by the spring motions and relative positions of a generally centrally located part of a wheel axle, and including means coupling said pumping and regulating element to axle means carrying two axially aligned wheels such that movements of the wheels in the same sense relative to the vehicle body effect actuation and control of the pumping and regulating element in the same manner, and such relative movements of the wheels in opposite senses effect such actuation and control in opposite manners, whereby relatively upward movement of one wheel tends to add to or enhance the actuation and control effect of relatively upward movement by the other wheel, and tends to reduce or neutralize the actuation and control effect of relatively downward movement by the other wheel, and vice versa.

* * * * *